(12) United States Patent
Proksch et al.

(10) Patent No.: US 7,084,384 B2
(45) Date of Patent: Aug. 1, 2006

(54) DIFFRACTIVE OPTICAL POSITION DETECTOR IN AN ATOMIC FORCE MICROSCOPE HAVING A MOVEABLE CANTILEVER

(75) Inventors: Roger Proksch, Santa Barbara, CA (US); Jason Cleveland, Ventura, CA (US); Dan Bocek, Goleta, CA (US)

(73) Assignee: Asylum Research Corporation, Santa Barbara, CA (US)

( * ) Notice: Subject to any disclaimer, the term of this patent is extended or adjusted under 35 U.S.C. 154(b) by 0 days.

(21) Appl. No.: 11/093,187

(22) Filed: Mar. 28, 2005

(65) Prior Publication Data

US 2006/0072185 A1    Apr. 6, 2006

Related U.S. Application Data

(63) Continuation of application No. 10/226,625, filed on Aug. 23, 2002, now Pat. No. 6,884,981.

(60) Provisional application No. 60/314,075, filed on Aug. 23, 2001.

(51) Int. Cl.
*G02B 7/04* (2006.01)
(52) U.S. Cl. .................................. 250/201.3; 250/306
(58) Field of Classification Search ............. 250/201.3, 250/306
See application file for complete search history.

(56) References Cited

U.S. PATENT DOCUMENTS

| | | | |
|---|---|---|---|
| 4,669,300 A | 6/1987 | Hall et al. | |
| 4,725,142 A | 2/1988 | Sharnoff | 356/347 |
| 5,477,383 A | 12/1995 | Jain | |
| 5,825,020 A | 10/1998 | Hansma et al. | |
| 5,939,709 A * | 8/1999 | Ghislain et al. | 250/216 |
| 6,032,518 A | 3/2000 | Prater et al. | |
| 6,055,106 A | 4/2000 | Grier et al. | |

OTHER PUBLICATIONS

Ashkin, A., "Acceleration and Trapping of Particles by Radiation Pressure", Jan. 26, 1970, Physical Review Letters, vol. 24, No. 4, pp. 156-159.
Ashkin, A., et al., "Observation of a Single-Beam Gradient Force Optical Trap for Dielectric Particles", May 1986, Optics Letters, vol. 11, No. 5, pp. 288-290.

(Continued)

*Primary Examiner*—Que T. Le
(74) *Attorney, Agent, or Firm*—Morgan, Lewis & Bockius LLP

(57) ABSTRACT

An apparatus and method for measuring optically the position or angle of a variety of objects or arrays of objects, including cantilevers in scanning probe microscopy, micromechanical biological and chemical sensors and the sample or a probe in surface profilometry. The invention involves the use of one or more diffractive optical elements, including diffraction gratings and holograms, combined with conventional optical elements, to form a plurality of light beams, each with a selectable shape and intensity, from a single light source, reflect the beams off mechanical objects and process the reflected beams, all to the end of measuring the position of such objects with a high degree of precision. The invention may also be used to effect mechanical changes in such objects. Devices with these improvements have numerous applications, including molecular force measurements, atomic force microscopy and manipulation technology, lithographic manufacturing, nanometer scale surface profiling and other aspects of nanotechnology.

11 Claims, 11 Drawing Sheets

OTHER PUBLICATIONS

Ashkin, A., et al. "Optical Trapping and Manipulation of Single Cells Using Infrared Laser Beams", Dec. 1987, Nature, vol. 330 24/31, pp. 769-771.

Svoboda and Block, "Biological Applications of Optical Forces", 1994, Annu. Rev. Biophys. Biomol. Struct., vol. 23, pp. 247-285.

Ashkin, Arthur, "Optical Trapping and Manipulation of Neutral Particles Using Lasers", May 1997, Proc. Natl. Acad. Sci. USA, vol. 94, pp. 4853-4860.

Sasaki, K., et al., "Pattern Formation and Flow Control of Fine Particles by Laser-Scanning Micromanipulation", Oct. 1, 1991, Optics Letters, vol. 16, No. 19, pp. 1463-1465.

Dufresne, Eric R., and Grier, David G., "Optical Tweezer Arrays and Optical Substrates Created with Diffractive Optics", May 1998, Review of Scientific Instruments, vol. 69, No. 5, pp. 1974-1977.

Chiou, Arthur E., et al., "Interferometric Optical Tweezers", Jan. 1, 1997, Optical Communications, vol. 133, pp. 7-10.

Reicherter, M., et al., "Optical Particle Trapping with Computer-Generated Holograms Written on a Liquid-Crystal Display", May 1, 1999, Optics Letters, vol. 24, No. 9, pp. 608-610.

Glückstad, Jesper, "Phase Contrast Image Synthesis", Oct. 1, 1996, Optics Communications, vol. 130, pp. 225-230.

Glückstad, J., et al., "Lossless Light Projection", Sep. 15, 1997, Optics Letters, vol. 22, No. 18, pp. 1373-1375.

Glückstad and Mogensen, "Reconfigurable Ternary-Phase Array Illuminator Based on the Generalised Phase Contrast Method", Jan. 1, 2000, Optics Communications, vol. 173, pp. 169-175.

Zernike, F., "How I Discovered Phase Contrast", Mar. 11, 1955, Science, vol. 121, pp. 345-349.

Glückstad, J., "Pattern Generation by Inverse Phase Contrast", Feb. 1, 1998, Optics Communications, vol. 147, pp. 16-18.

Glückstad, J., "Graphic Method for Analyzing Common Path Interferometers", 1998, Appl. Opt., vol. 37, pp. 8151-8152.

Mukohzaka, N., et al., "Diffraction Efficiency Analysis of a Parallel-Aligned Nematic-Liquid-Crystal Spatial Light Modulator", May 10, 1994, Applied Optics, vol. 33, No. 14, pp. 2804-2811.

Mogensen and Glückstad, "A Phase-Based Optical Ecryption System with Polarisation Encoding", Jan. 1, 2000, Optics Communications, vol. 173, pp. 177-183.

Misawa, H., et al., "Multibeam Laser Manipulation and Fixation of Microparticles", Jan. 20, 1992, Appl. Phys. Lett., vol. 60, No. 3, pp. 310-312.

Fällman and Axner, "Design for Fully Steerable Dual-Trap Optical Tweezers", Apr. 1, 1997, Applied Optics, vol. 36, No. 10, pp. 2107-2113.

Simmons, Robert M., et al., "Quantitative Measurements of Force and Displacement Using an Optical Trap", Apr. 1996, Biophysical Journal, vol. 70, pp. 1813-1822.

Heckenberg, N.R., et al., "Laser Beams with Phase Singularities", 1992, Optical and Quantum Electronics, vol. 24, pp. S951-S962.

Gahagan and Swartzlander, "Optical Vortex Trapping of Particles", Jun. 1, 1996, Optics Letters, vol. 21, No. 11, pp. 827-829.

Totzeck and Tiziani, "Phase-Signularities in 2D Diffraction Fields and Interference Microscopy", Jun. 1, 1997, Optics Communications, vol. 138, pp. 365-382.

Crocker and Grier, "Microscopic Measurement of the Pair Interaction Potential of Charge-Stabilized Colloid", Jul. 11, 1994, Physical Review Letters, vol. 73, No. 2, pp. 352-356.

Crocker and Grier, "Methods of Digital Video Microscopy for Colloidal Studies", 1996, Journal of Colloid and Interface Science, vol. 179, pp. 298-310.

Dinsmore, A.D., et al., "Entropic Control of Particle Motion Using Passive Surface Microstructures", Sep. 19, 1996, Nature, vol. 383, pp. 239-242.

Larsen and Grier, "Like-Charge Attractions in Metastable Colloidal Crystallites", Jan. 16, 1997, Nature, vol. 385, pp. 230-233.

Sugimoto, T., et al., "Direct Measurement of Interparticle Forces by the Optical Trapping Technique", 1997, Langmuir, vol. 13, No. 13, pp. 5528-5530.

Smith, S.B., et al., "Direct Mechanical Measurements of the Elasticity of Single DNA Molecules by Using Magnetic Beads", Nov. 13, 1992, Science, vol. 258, pp. 1122-1126.

Bustamante, C., et al., "Technical Comments: Entropic Elasticity of λ-Phage DNA", Sep. 9, 1994, Science, vol. 265, pp. 1599-1600.

Yin, H. et al., "Transcription Against and Applied Force", Dec. 8, 1995, Science, vol. 270, pp. 1653-1657.

Perkins, T.T., et al., "Stretching of a Single Tethered Polymer in a Uniform Flow", Apr. 7, 1995, Science, vol. 268, pp. 83-87.

Smith, S.B., et al., "Overstretching B-DNA: The Elastic Response of Individual Double-Stranded and Single-Stranded DNA Molecules", Feb. 9, 1996, Science, vol. 271, pp. 795-799.

Felgner, H., et al., "Flexural Rigidity of Microtubules Measured with the Use of Optical Tweezers", 1996, Journal of Cell Science 109, pp. 509-516.

Wang, M.D., et al., "Stretching DNA with Optical Tweezers", Mar. 1997, Biophyscial Journal, vol. 72, pp. 1335-1346.

Bar-Ziv and Moses, "Instability and "Pearling" States Produced in Tubular Membranes by Competition of Curvature and Tension", Sep. 5, 1994, Physical Review Letters, vol. 73, No. 10, pp. 1392-1395.

Bar-Ziv, et al., "Local Unbinding of Pinched Membranes", Oct. 30, 1995, Physical Reveiw Letters, vol. 75, No. 18, pp. 3356-3361.

Bar-Ziv, et al., "Entropic Expulsion in Vesicles", Nov. 6, 1995, Physical Review Letters, vol. 75, No. 19, pp. 3481-3487.

Moroz, J.D., et al., "Spontaneous Expulsion of Giant Lipid Vesicles Induced by Laser Tweezers", Jan. 13, 1997, Physical Review Letters, vol. 78, No. 2, pp. 386-389.

Gouesbet, G., et al., "Light Scattering from a Sphere Arbitrarily Located in a Guassian Beam, Using a Bromwich Formulation", Sep. 1988, J. Opt. Soc. Am. A., vol. 5, No. 9, pp. 1427-1443.

Ashkin, A., "Forces of Single-Beam Gradient Laser Trap on a Dielectric Sphere in the Ray Optics Regime", Feb. 1992, Biophysical Journal, vol. 61, pp. 569-582.

Ren, K.F., et al., "Prediction of Reverse Radiation Pressure by Generalized Lorenz-Mie Theory", May 20, 1996, Applied Optics, vol. 35, No. 15, pp. 2702-2710.

Farsund and Felderhof, "Force, Torque, and Absorbed Energy for a Body of Arbitrary Shape and Constitution in an Electromagnetic Radiation Field", 1996, Physica A, vol. 227, pp. 108-130.

Harada and Asakura, "Radiation Forces on a Dielectric Sphere in the Rayleigh Scattering Regime" Mar. 15, 1996, Optics Communications, vol. 124, pp. 529-541.

Faucheux and Libchaber, "Confined Brownian Motion", Jun. 1994, Physical Review E, vol. 49, No. 6, pp. 5158-5164.

Visscher, K., et al., "Construction of Multiple-Beam Optical Traps with Nanometer-Resolution Position Sensing", Dec. 1996, IEEE Journal of Selected Topics in Quantum Electronics, vol. 2, No. 4, pp. 1066-1076.

Sasaki, K., et al., "Laser-Scanning Micromanipulation and Spatial Patterning of Fine Particles", May 1991, Japanese Journal of Applied Physics, vol. 30, No. 5B, pp. L907-L909.

Heckenberg and Rubinsztein-Dunlop, "Optical Particle Trapping with Higher-Order Doughnut Beams Produced Using High Efficiency Computer Generated Holograms", 1995, Journal of Modern Optics, vol. 42, No. 1, pp. 217-223.

Chowdhury and Ackerson, "Laser-Induced Freezing", Aug. 19, 1985, Physical Review Letters, vol. 55, No. 8, pp. 833-837.

Ackerson and Chowdhury, "Radiation Pressure as a Technique for Manipulating the Order in Colloidal Suspensions", 1987, Faraday Discuss, Chem. Soc., vol. 83, pp. 309-316.

Loudiyi and Ackerson, "Direct Observation of Laser Induced Freezing", 1992, Physica A, vol. 184, pp. 1-25.

Loudiyi and Ackerson, "Monte Carlo Simulation of Laser Induced Freezing", 1992, Physica A, vol. 184, pp. 26-41.

Burns, M.M., et al., "Optical Matter: Crystallization and Binding in Intense Optical Fields", Aug. 17, 1990, Science, vol. 249, pp. 749-754.

Chowdhury, A., et al. "Optical Crystallization Work", May 24, 1991, Science, vol. 252, pp. 1049.

Burns, M.M., et al., "Optical Crystallization Work", May 24, 1991, Science, vol. 252, pp. 1049.

Chakrabarti, J., et al. "Density Functional Theory of Laser-Induced Freezing in Colloidal Suspensions", Nov. 21, 1994, Physical Review Letters, vol. 73, No. 21, pp. 2923-2926.

Chakrabarti, J., et al., "Reentrant Melting in Laser Field Modulated Colloidal Suspensions", Sep. 11, 1995, Physical Review Letters, vol. 75, No. 11, pp. 2232-2235.

Pan, G., et al., "Optically Nonlinear Bragg Diffracting Nanosecond Optical Switches", May 19, 1997, Physical Review Letters, vol. 78, No. 20, pp. 3860-3863.

Grier, D., "Colloids Make Ultrafast Optical Devices", Jul. 1997, Physics World, vol. 10, pp. 24-25.

Holtz and Asher, "Polymerized Colloidal Crystal Hydrogel Films as Intelligent Chemical Sensing Materials", Oct. 1997, Nature, vol. 389, pp. 829-832.

Grier, D., "New Age Crystals", Oct. 23, 1997, Nature, vol. 389, pp. 784-785.

Blaaderen, A., et al., "Template-Directed Colloidal Crystallization", Jan. 23, 1997, Nature, vol. 385, pp. 321-323.

Bier and Astumian, "Biasing Brownian Motion in Different Directions in a 3-State Fluctuating Potential and an Application for the Separation of Small Particles", May 27, 1996, Physical Review Letters, vol. 76, No. 22, pp. 4277-4280.

Faucheux, L.P., et al., "Optical Thermal Ratchet", Feb. 27, 1995, Physical Review Letters, vol. 74, No. 9, pp. 1504-1507.

Faucheux, L.P., et al., "Periodic Forcing of a Brownian Particle", Jun. 1995, Physical Review E, vol. 51, No. 6, pp. 5239-5252.

Gauthier, Robert C., "Ray Optics Model and Numerical Computations for the Radiation Pressure Micromotor", Oct. 16, 1995, Appl. Phys. Lett., vol. 67, pp. 2269-2271.

Igasaki, Yasunori, et al.,"High Efficiency Electrically-Addressable Phase-Only Spatial Light Modulator", 1999, Optical Review, vol. 6, No. 4, pp. 339-344.

Altmann, S. M., et al., "Multiple sensor stabilization system for local probe microscopes", Jan. 2001, Review of Scientific Instruments, vol. 72, No. 1, pp. 142-149.

Grier, D. G., "Optical Tweezers in Colloid and Interface Science", Feb. 5, 1997, Current Opinion in Colloid Interface Science, vol. 2, pp. 264-274.

Morgensen, Paul C., et al., "Dynamic array generation and pattern formation for optical tweezers", Feb. 15, 2000, Optics Communications, vol. 175, pp. 75-81.

Schäffer, Tilman E., et al., "Characterization and optimization of the detection sensitivity of an atomic force microscope for small cantilevers", J. of Applied Physics, Nov. 1, 1998, vol. 84, No. 9, pp. 4661-4666.

Altmann, S. M., et al., "Multiple sensor stabilization system for local probe microscopes", Jan. 2001, Review of Scientific Instruments, vol. 72, No. 1, pp. 142-149.

Grier, D. G., "Optical Tweezers in Colloid and Interface Science", Feb. 5, 1997, Current Opinion in Colloid Interface Science, vol. 2, pp. 264-274.

Morgensen, Paul C., et al., "Dynamic array generation and pattern formation for optical tweezers", Feb. 15, 2000, Optics Communications, vol. 175, pp. 75-81.

Schäfer, Tilman E., et al., "Characterization and optimization of the detection sensitivity of an atomic force microscope for small cantilevers", J. of Applied Physics, Nov. 1, 1998, vol. 84, No. 9, pp. 4661-4666.

Ashkin, A.,"Acceleration and Trapping of Particles by Radiation Pressure", Jan. 26, 1970, Physical Review Letters, vol. 24, No. 4, pp. 156-159.

Ashkin, A., et al.,"Observation of a Single-Beam Gradient Force Optical Trap for Dielectric Particles", May 1986, Optics Letters, vol. 11, No. 5, pp. 288-290.

Ashkin, A., et al. "Optical Trapping and Manipulation of Single Cells Using Infrared Laser Beams", Dec. 1987, Nature, vol. 330 24/31, pp. 769-771.

Svoboda and Block, "Biological Applications of Optical Forces", 1994, Annu. Rev. Biophys. Biomol. Struct., vol. 23, pp. 247-285.

Ashkin, Arthur, "Optical Trapping and Manipulation of Neutral Particles Using Lasers", May 1997, Proc. Natl. Acad. Sci. USA, vol. 94, pp. 4853-4860.

Sasaki, K., et al., "Pattern Formation and Flow Control of Fine Particles by Laser-Scanning Micromanipulation", Oct. 1, 1991, Optics Letters, vol. 16, No. 19, pp. 1463-1465.

Dufresne, Eric R., and Grier, David G., "Optical Tweezer Arrays and Optical Substrates Created with Diffractive Optics", May 1998, Review of Scientific Instruments, vol. 69, No. 5, pp. 1974-1977.

Chiou, Arthur E., et al., "Interferometric Optical Tweezers", Jan. 1, 1997, Optics Communications, vol. 133, pp. 7-10.

Reicherter, M., et al., "Optical Particle Trapping with Computer-Generated Holograms Written on a Liquid-Crystal Display", May 1, 1999, Optics Letters, vol. 24, No. 9, pp. 608-610.

Glückstad, Jesper, "Phase Contrast Image Synthesis", Oct. 1, 1996, Optics Communications, vol. 130, pp. 225-230.

Glückstad, J., et al., "Lossless Light Projection", Sep. 15, 1997, Optics Letters, vol. 22, No. 18, pp. 1373-1375.

Glüstad and Mogensen, "Reconfigurable Ternary-Phase Array Illuminator Based on the Generalised Phase Contrast Method", Jan. 1, 2000, Optics Communications, vol. 173, pp. 169-175.

Zernike, F., "How I Discovered Phase Contrast", Mar. 11, 1955, Science, vol. 121, pp. 345-349.

Glückstad, J., "Pattern Generation by Inverse Phase Contrast", Feb. 1, 1998, Optics Communications, vol. 147, pp. 16-18.

Glückstad, J., "Graphic Method for Analyzing Common Path Interferometers", 1998, Appl. Opt., vol. 37, pp. 8151-8152.

Mukohzaka, N., et al., "Diffraction Efficiency Analysis of a Parallel-Aligned Nematic-Liquid-Crystal Spatial Light Modulator", May 10, 1994, Applied Optics, vol. 33, No. 14, pp. 2804-2811.

Mogensen and Glückstad, "A Phase-Based Optical Ecryption System with Polarisation Encoding", Jan. 1, 2000, Optics Communcations, vol. 173, pp. 177-183.

Misawa, H., et al., "Multibeam Laser Manipulation and Fixation of Microparticles", Jan. 20, 1992, Appl. Phys. Lett., vol. 60, No. 3, pp. 310-312.

Fällman and Axner, "Design for Fully Steerable Dual-Trap Optical Tweezers", Apr. 1, 1997, Applied Optics, vol. 36, No. 10, pp. 2107-2113.

Simmons, Robert M., et al., "Quantitative Measurements of Force and Displacement Using an Optical Trap", Apr. 1996, Biophysical Journal, vol. 70, pp. 1813-1822.

Heckenberg, N.R., et al., "Laser Beams with Phase Singularities", 1992, Optical and Quantum Electronics, vol. 24, pp. S951-S962.

Gahagan and Swartzlander, "Optical Vortex Trapping of Particles", Jun. 1, 1996, Optics Letters, vol. 21, No. 11, pp. 827-829.

Totzeck and Tiziani, "Phase-Singularities in 2D Diffraction Fields and Interference Microscopy", Jun. 1, 1997, Optics Communications, vol. 138, pp. 365-382.

Crocker and Grier, "Microscopic Measurement of the Pair Interaction Potential of Charge-Stabilized Colloid", Jul. 11, 1994, Physical Review Letters, vol. 73, No. 2, pp. 352-356.

Crocker and Grier, "Methods of Digital Video Microscopy for Colloidal Studies", 1996, Journal of Colloid and Interface Science, vol. 179, pp. 298-310.

Dinsmore, A.D., et al., "Entropic Control of Particle Motion Using Passive Surface Microstructures", Sep. 19, 1996, Nature, vol. 383, pp. 239-242.

Larsen and Grier, "Like-Charge Attractions in Metastable Colloidal Crystallites", Jan. 16, 1997, Nature, vol. 385, pp. 230-233.

Sugimoto, T., et al., "Direct Measurement of Interparticle Forces by the Optical Trapping Technique", 1997, Langmuir, vol. 13, No. 13, pp. 5528-5530.

Smith, S.B., et al., "Direct Mechanical Measurements of the Elasticity of Single DNA Molecules by Using Magnetic Beads", Nov. 13, 1992, Science, vol. 258, pp. 1122-1126.

Bustamante, C., et al., "Technical Comments: Entropic Elasticity of λ-Phage DNA", Sep. 9, 1994, Science, vol. 265, pp. 1599-1600.

Yin, H. et al.,"Transcription Against and Applied Force", Dec. 8, 1995, Science, vol. 270, pp. 1653-1657.

Perkins, T.T., et al.,"Stretching of a Single Tethered Polymer in a Uniform Flow", Apr. 7, 1995, Science, vol. 268, pp. 83-87.

Smith, S.B., et al., "Overstretching B-DNA: The Elastic Response of Individual Double-Stranded and Single-Stranded DNA Molecules", Feb. 9, 1996, Science, vol. 271, pp. 795-799.

Felgner, H., et al., "Flexural Rigidity of Microtubules Measured with the Use of Optical Tweezers", 1996, Journal of Cell Science 109, pp. 509-516.

Wang, M.D., et al., "Stretching DNA with Optical Tweezers", Mar. 1997, Biophysical Journal, vol. 72, pp. 1335-1346.

Bar-Ziv and Moses, "Instability and "Pearling" States Produced in Tubular Membranes by Competition of Curvature and Tension", Sep. 5, 1994, Physical Review Letters, vol. 73, No. 10, pp. 1392-1395.

Bar-Ziv, et al., "Local Unbinding of Pinched Membranes", Oct. 30, 1995, Physical Review Letters, vol. 75, No. 18, pp. 3356-3361.

Bar-Ziv, et al., "Entropic Expulsion in Vesicles", Nov. 6, 1995, Physical Review Letters, vol. 75, No. 19, pp. 3481-3487.

Moroz, J.D., et al., "Spontaneous Expulsion of Giant Lipid Vesicles Induced by Laser Tweezers", Jan. 13, 1997, Physical Review Letters, vol. 78, No. 2, pp. 386-389.

Gouesbet, G., et al., "Light Scattering from a Sphere Arbitrarily Located in a Guassian Beam, Using a Bromwich Formulation", Sep. 1988, J. Opt. Soc. Am. A., vol. 5, No. 9, pp. 1427-1443.

Ashkin, A., "Forces of a Single-Beam Gradient Laser Trap on a Dielectric Sphere in the Ray Optics Regime", Feb. 1992, Biophysical Journal, vol. 61, pp. 569-582.

Ren, K.F., et al., "Prediction of Reverse Radiation Pressure by Generalized Lorenz-Mie Theory", May 20, 1996, Applied Optics, vol. 35, No. 15, pp. 2702-2710.

Farsund and Felderhof, "Force, Torque, and Absorbed Energy for a Body of Arbitrary Shape and Constitution in an Electromagnetic Radiation Field", 1996, Physica A, vol. 227, pp. 108-130.

Harada and Asakura, "Radiation Forces on a Dielectric Sphere in the Rayleigh Scattering Regime" Mar. 15, 1996, Optics Communications, vol. 124, pp. 529-541.

Faucheux and Libchaber, "Confined Brownian Motion", Jun. 1994, Physical Review E, vol. 49, No. 6, pp. 5158-5164.

Visscher, K., et al., "Construction of Multiple-Beam Optical Traps with Nanometer-Resolution Position Sensing", Dec. 1996, IEEE Journal of Selected Topics in Quantum Electronics, vol. 2, No. 4, pp. 1066-1076.

Sasaki, K., et al., "Laser-Scanning Micromanipulation and Spatial Patterning of Fine Particles", May 1991, Japanese Journal of Applied Physics, vol. 30, No. 5B, pp. L907-L909.

Heckenberg and Rubinsztein-Dunlop, "Optical Particle Trapping with Higher-Order Doughnut Beams Produced Using High Efficiency Computer Generated Holograms", 1995, Journal of Modern Optics, vol. 42, No. 1, pp. 217-223.

Chowdhury and Ackerson, "Laser-Induced Freezing", Aug. 19, 1985, Physical Review Letters, vol. 55, No. 8, pp. 833-837.

Ackerson and Chowdhury, "Radiation Pressure as a Technique for Manipulating the Order in Colloidal Suspensions", 1987, Faraday Discuss, Chem. Soc., vol. 83, pp. 309-316.

Loudiyi and Ackerson, "Direct Observation of Laser Induced Freezing", 1992, Physica A, vol. 184, pp. 1-25.

Loudiyi and Ackerson, "Monte Carlo Simulation of Laser Induced Freezing", 1992, Physica A, vol. 184, pp. 26-41.

Burns, M.M., et al., "Optical Matter: Crystallization and Binding in Intense Optical Fields", Aug. 17, 1990, Science, vol. 249, pp. 749-754.

Chowdhury, A., et al. "Optical Crystallization Work", May 24, 1991, Science, vol. 252, pp. 1049.

Chakrabarti, J., et al. "Density Functional Theory of Laser-Induced Freezing in Colloidal Suspensions", Nov. 21, 1994, Physical Review Letters, vol. 73, No. 21, pp. 2923-2926.

Chakrabarti, J., et al., "Reentrant Melting in Laser Field Modulated Colloidal Suspensions", Sep. 11, 1995, Physical Review Letters, vol. 75, No. 11, pp. 2232-2235.

Pan, G., et al., "Optically Nonlinear Bragg Diffracting Nanosecond Optical Switches", May 19, 1997, Physical Review Letters, vol. 78, No. 20, pp. 3860-3863.

Grier, D., "Colloids Make Ultrafast Optical Devices", Jul. 1997, Physics World, vol. 10, pp. 24-25.

Holtz and Asher, "Polymerized Colloidal Crystal Hydrogel Films as Intelligent Chemical Sensing Materials", Oct. 1997, Nature, vol. 389, pp. 829-832.

Grier, D., "New Age Crystals", Oct. 23, 1997, Nature, vol. 389, pp. 784-785.

Blaaderen, A., et al., "Template-Directed Colloidal Crystallization", Jan. 23, 1997, Nature, vol. 385, pp. 321-323.

Bier and Astumian, "Biasing Brownian Motion in Different Directions in a 3-State Fluctuating Potential and an Application for the Separation of Small Particles", May 27, 1996, Physical Review Letters, vol. 76, No. 22, pp. 4277-4280.

Faucheux, L.P., et al., "Optical Thermal Ratchet", Feb. 27, 1995, Physical Review Letters, vol. 74, No. 9, pp. 1504-1507.

Faucheux, L.P., et al., "Periodic Forcing of a Brownian Particle", Jun. 1995, Physical Review E, vol. 51, No. 6, pp. 5239-5252.

Gauthier, Robert C., "Ray Optics Model and Numerical Computations for the Radiation Pressure Micromotor", Oct. 16, 1995, Appl. Phys. Lett., vol. 67, No. 16, pp. 2269-2271.

Igasaki, Y., et al., "High Efficiency Electrically-Addressable Phase-Only Spatial Light Modulator", Optical Review, vol. 6, No. 4, 1999, pp. 339-344.

* cited by examiner

DIFFRACTIVE OPTICAL POSITION DETECTOR IN AN ATOMIC FORCE MICROSCOPE HAVING A MOVEABLE CANTILEVER

CROSS-REFERENCE TO RELATED APPLICATIONS

This application is a continuation of U.S. application Ser. No. 10/226,625, filed on Aug. 23, 2002 now U.S. Pat. No. 6,884,981, which claims priority of U.S. Provisional Application No. 60/314,075, filed on Aug. 23, 2001, the disclosures of which are incorporated fully herein by reference.

BACKGROUND AND SUMMARY OF THE INVENTION

The present invention is related to a general method and apparatus for optically measuring the position of single or multiple mechanical components.

There are numerous examples of using the deflection from a single optical beam for positional measurements, the optical lever detection system commonly used in atomic force microscopes (AFMs) being perhaps the most notable. One such optical lever system is illustrated in FIG. 1. In this system a light beam 2, preferably formed by a laser 1 (including a superluminescent laser or diode) with sufficient intensity and lack of pointing or other noise, is directed through a collimation lens or lens assembly 3 and a focusing lens or lens assembly 5 and onto a mirror 6 which directs the focused light beam 7 onto a particular spot on a cantilever 8 in the same reference frame as the optical lever system. The reflected beam 9 is then collected by detection optics, which often include an adjustable mirror and a translation stage for providing an offset to the beam position (not shown), and made to illuminate a position sensitive detector 10 (PSD). As the cantilever moves in response to various forces, the position of the reflected spot on the PSD changes, causing a change in the output. It will be noted that the optical axis of the system 27 coincides with the axis of the light beam as it propagates through the system.

Another prior art AFM optical lever system, in which the cantilever and the optical lever system are in different reference frames, attempts to track the position of the cantilever as it is scanned over a surface. There are a number of schemes to accomplish this. The most successful, based on a tracking lens that moves with the piezo tube scanning the cantilever, is described in U.S. Pat. No. 6,032,518.

There has been a great deal of work on optimizing the sensitivity of AFM optical lever detection systems. All of the optimization techniques can be implemented using the invention disclosed herein and most are easier to implement using the invention.

The employment of two- or multiple-beam systems in positional measurement instruments provides significant advantages. In the case of AFMs and other scanning probe instruments, a second beam can provide a reference for more accurate positional measurements. A second or multiple beams can also allow more than one cantilever probe to be used in imaging. In the case of micromechanical sensors, a second or multiple optical beams can be used to provide a baseline reference signal for comparison with the active sensor element to compensate for thermal drift or other effects. Two or more beams also make it possible to simultaneously observe more sensors, thereby increasing through-put. For optical profilometers, multiple beams offer the possibility of increasing throughput or simultaneous monitoring of several positions.

There are a number of multiple beam systems in the prior art. To date, these systems rely upon two or more separate light sources focused onto different locations. This complexity has limited the use of multiple beam sensor arrays in any number of commercial applications including high throughput scanning probe microscopes or micromechanical sensors containing numerous sensing elements and control levers for background measurements.

Diffractive Optical Elements (DOEs) provide a flexible and powerful means for splitting the beam from a single source of light into multiple beams and varying the intensity and shape of each beam. When using a DOE it is possible to illuminate an array of cantilevers or other mechanical structures using only one light source. The spacing between the focused spots and the spot geometry can be controlled. The multiple beams can also be shaped to vary the sensitivity of the measurement and the beams can be steered either individually or as a group.

Shaping the spot has important consequences for cantilever based force measurements; it is possible to minimize lost optical power and therefore spurious interference effects as well as optimizing the optical lever sensitivity with a correctly chosen beam shape. By changing the beam shape as well as the position, it is possible to vary the optical lever sensitivity. It is also possible to vary the dc offset of the detector. DOEs make a continuum of beam shapes available to the experimenter. For optical profiling applications, changing the beam shape allows the resolution of the profilometer to be tuned to the application.

Finally DOEs may be used to modulate the intensity of a single or multiple beams, allowing a variety of other measurements to be made. One example is that this modulation can be used to allow synchronous detection of the position or angle of the sensing element. In the case of sensitive transducers, it is also possible to use the modulated optical energy to actuate the illuminated object, either through light pressure or a number of thermal effects.

There are a variety of commercial DOEs available off the shelf. Numerous manufacturers can fabricate OEM components to a variety of specifications. If active DOEs are used (such as phase shifting liquid crystals or phase shifting reflective mirrors) the beam shape can be dynamically changed as different cantilevers are used. A further advantage of active DOEs is that not only beam shape but also the beam position can be controlled. This allows the beam position to be chosen without any moving mechanical parts. It also makes it possible to change the relative position of the cantilever and detector during the experiment while maintaining the spot focused on the lever. This ability to track the cantilever position means that a variety of beam-tracking AFMs can be realized that do not depend on complicated mechanical apparatus or on heavy optical systems that are scanned along with the moving sensor.

One challenge of a multiple sensor system used for chemical, biological or other sensing applications is separating the beams once they have reflected off the sensors. This can be accomplished with a suitable arrangement of lenses that are used to collect the light and separate it allowing the use of multiple PSDs. As mentioned above, programmable DOEs allow the possibility of modulating the intensity of individual beams in an array, allowing it to be unambiguously identified by a PSD even in the presence of other beams or other background noise. Again, as mentioned above, all of this is accomplished without the use of any moving parts. These arrays can also be translated by changing the DOE diffraction grating or hologram to account for changes in the cantilever position, either intentional (such as a positional change associated with scanning) or incidental (such as thermal drift) during the course of an experiment or measurement.

It has been pointed out that optical beams either through photon momentum changes, thermal effects or other means can cause mechanical changes in micromechanical components. DOE based sensors are compatible with a positional measurement being made with one beam while another is used to effect mechanical changes. Again, this can be accomplished with one light source if the experimenter wishes. Examples include exciting oscillations in a cantilever by sinusoidally varying the optical intensity and canceling the effects of thermal noise to enable low noise force measurements. As above, it is also possible to do this with an arbitrarily shaped array of a plurality of micromechanical components. Also as above, the beams can be translated either individually or as a unit during the course of the experiment by appropriate changes of the DOE diffraction grating or hologram.

In the case of translating beam spots, the appropriate diffraction or hologram could be calculated ahead of time, stored and simply played back to the active DOE when necessary.

DESCRIPTION OF THE PREFERRED EMBODIMENTS

Figure 2:
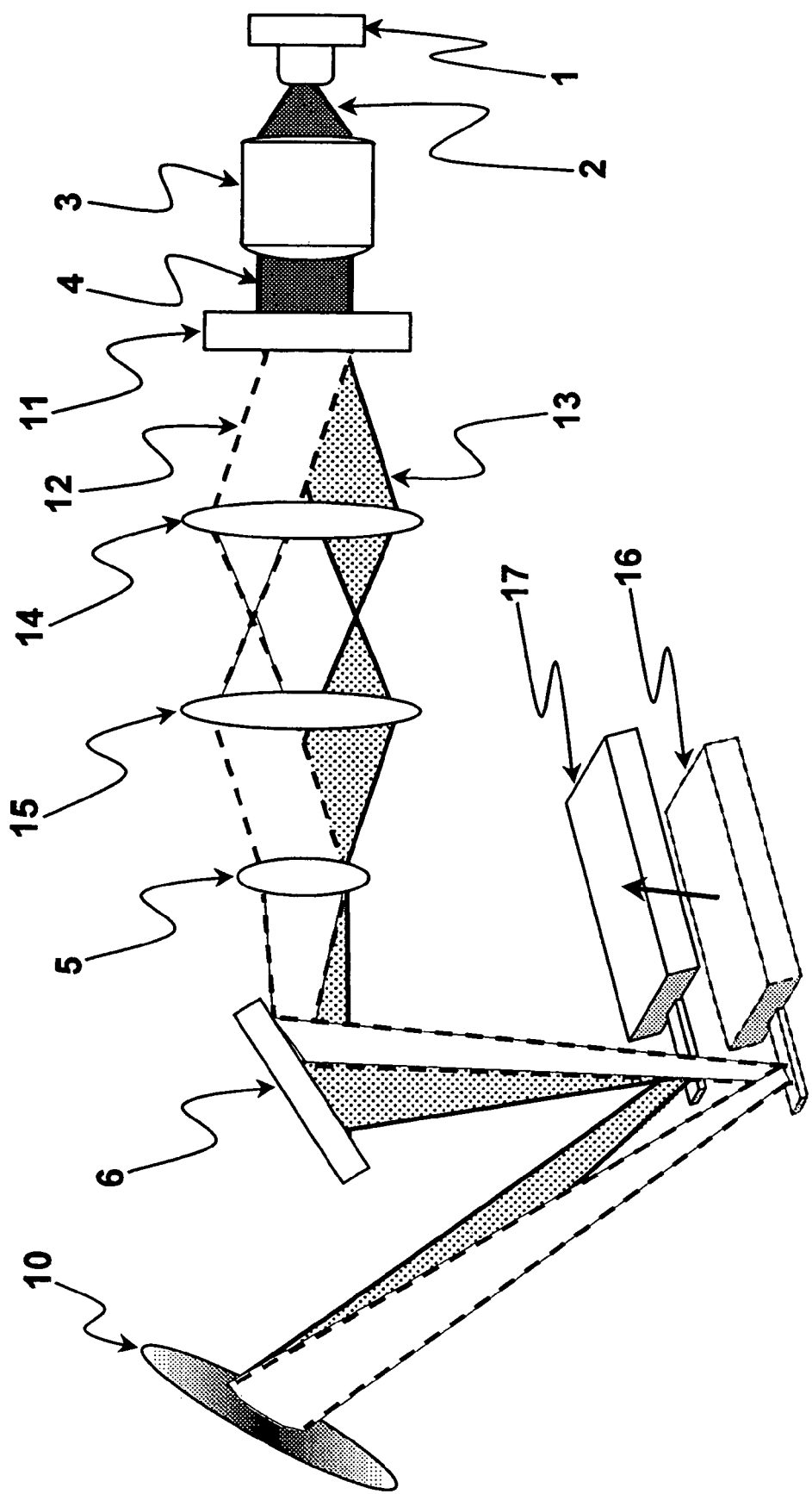
FIG. 2 shows an optical detector for an SPM using a DOE that allows tracking of the cantilever position as it is scanned over a sample surface relative to the optical components.

FIG. 2 shows an optical detector for an AFM using a DOE according to the invention disclosed herein. The purpose of this embodiment is to redirect an incident beam onto the cantilever as the cantilever moves, for example, as it scans over a surface relative to the optical assembly, where the cantilever and the optical detector are in different reference frames. Previous schemes devised to solve the problems presented by AFMs which decouple the cantilever and the optical detector have employed conventional optical technology. The most successful, based on a tracking lens that moves with the piezo tube scanning the cantilever, is described in U.S. Pat. No. 6,032,518. A major disadvantage of this and other schemes to deal with these problems is that they require the optical elements to be carried along with the cantilever. This adversely affects the AFM performance by requiring time consuming and imperfect factory adjustments of the optical elements to optimize the tracking performance and by adding extra mass to the cantilever scanning mechanism, slowing its response. The apparatus described in FIG. 2 overcomes both these difficulties. Because the DOE can be computer controlled, the tracking can be automatically and continuously adjusted to optimize tracking. Furthermore, since the DOE is positioned in the optical assembly, fixed in the reference frame of the other optical elements, there are no extra masses carried by the cantilever scanning mechanism, allowing much faster operation and a much simpler design.

Figure 1:
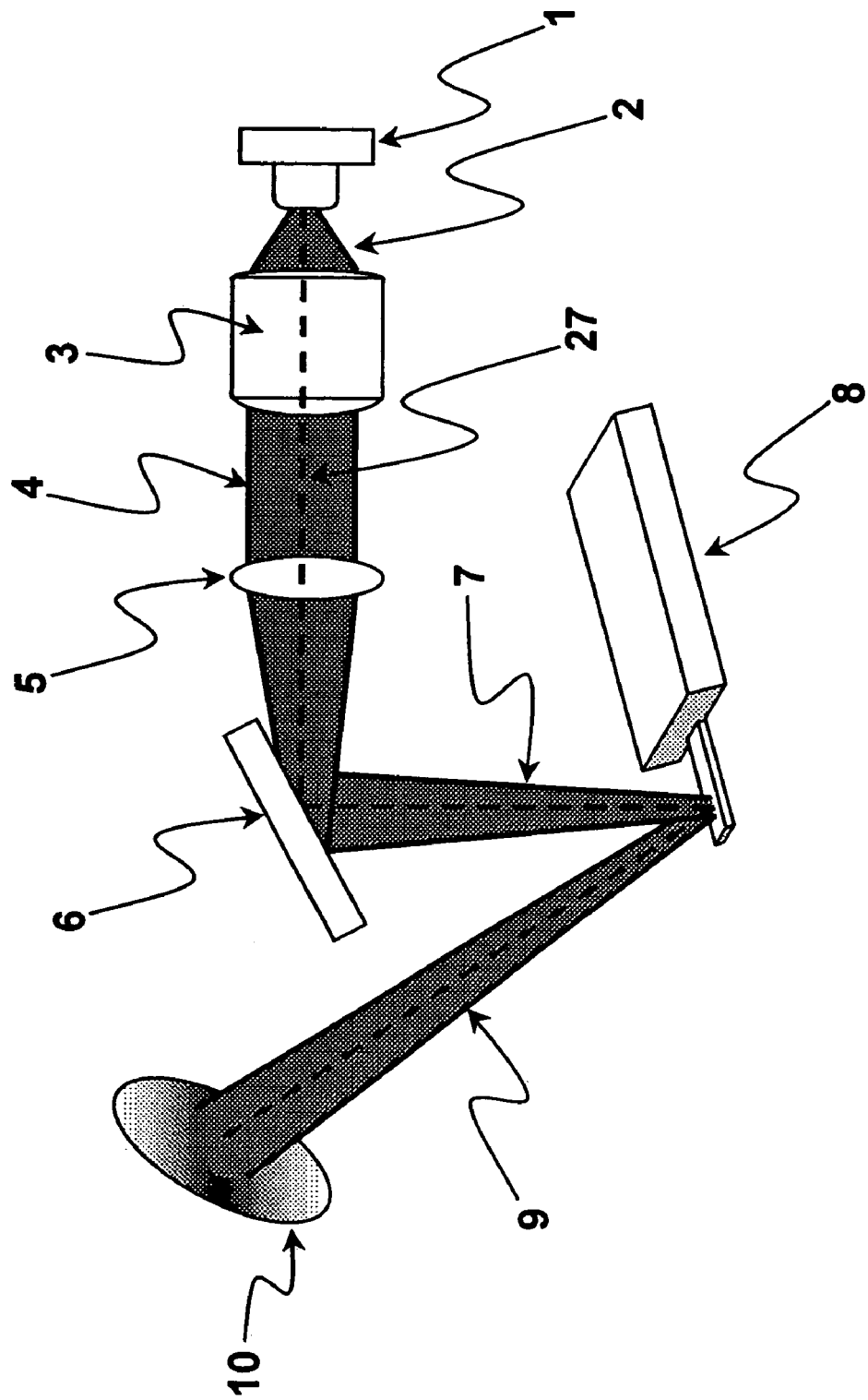
FIG. 1 shows a prior art optical detector for a scanning probe microscope with the cantilever fixed in the reference frame of the detector.

The FIG. 2 optical detector, like the prior art optical lever system illustrated in FIG. 1, employs a light beam 2, preferably formed by a laser 1 (including a superluminescent laser diode) with sufficient intensity and lack of pointing or other noise, which is directed through a collimation lens or lens assembly 3. The function of this light beam in the FIG. 2 optical detector and the others elements of this detector are however different and distinct from the prior art optical lever system illustrated in FIG. 1. In the FIG. 2 optical detector, the collimated or nearly collimated beam 4 emerging from the collimation lens or lens assembly 3 is directed through an adjustable DOE 11 which transmits the incoming beam 4 in a first beam 12. At a later time, in order to track the position of the cantilever, the DOE is adjusted to transmit a second beam 13 instead of the original beam 12. Those skilled in the art will appreciate that transmitting the beam 4 in two successive but different beams is arbitrary and, were it necessary for tracking multiple excursions of the cantilever, the beam could be redirected an arbitrary number of times. The redirected beams are passed through an optional dual lens array 14 and 15, having the functionality of an optical telescope. The magnification of the telescope can be adjusted to optimize the angular displacement of first beam 12 and second beam 13 and their widths on the focusing lens 5. In another embodiment of the invention, the telescope can be omitted from the instrument. The light then is directed onto the focusing lens or lens assembly 5 and onto a mirror 6 which will direct the first beam 12 onto a cantilever when it is in the first position 16 or the second beam 13 onto the same cantilever when it is in the second position 17. The focus lens or lens assembly 5 could be replaced with almost any focusing assembly including any number of objective lens assemblies. The beam reflected from the cantilever, either the first beam 12 or the second beam 13, is then collected by detection optics, which often include an adjustable mirror and a translation stage for providing an offset to the beam position (not shown), and made to illuminate a PSD 10. As the cantilever deflects in response to various forces, the position of the reflected spot on the PSD changes, causing a change in the output.

The DOE 11 is shown as being normal to the incident beam 4. One problem associated with DOEs is that they sometimes allow the zeroth order diffraction energy through to the focal plane. This is often referred to as a "hot spot".

By allowing the light to enter at an angle, it is possible to avoid this "hot spot" and only pass through controllable diffracted light.

The DOEs used in this invention can be phase-encoding or amplitude-encoding or mixed types. They can be fixed, manually adjustable or computer controllable. Examples of commercially available fixed DOEs include the 7×7 matrix generator (Part A54-195) from Edmund Scientific. Examples of manually adjustable DOEs include single and multiple slit diffraction gratings. Computer control provides some attractive features, one being that the computer can either dynamically calculate or pre-calculate the holograms and then "play" them out to the DOE. An example of a phase-encoding DOE (sometimes referred to as a Spatial Light Modulator, (SLM)) is the Hamamatsu X7550 or the one dimensional "Shape Shifter" SLM from Meadowlark Optics. Numerous other similar devices are being developed and released as of the filing of this application.

This ability to steer the beam has implications for improving the ease of use for an AFM. In current AFMs, cantilevers are loaded mechanically or by hand into a holder. Since there are small variations in the indexing of a cantilever each time one is loaded, it is necessary to adjust the spot position. This is typically accomplished using a mechanical system that changes the inclination and position of the optical axis to maximize the light reflected off of the cantilever. DOE-based optics provide a means for making this adjustment without the use of any mechanical components. This has obvious advantages over the current mechanical scheme, both for reliability and for automating the process.

Figure 3:
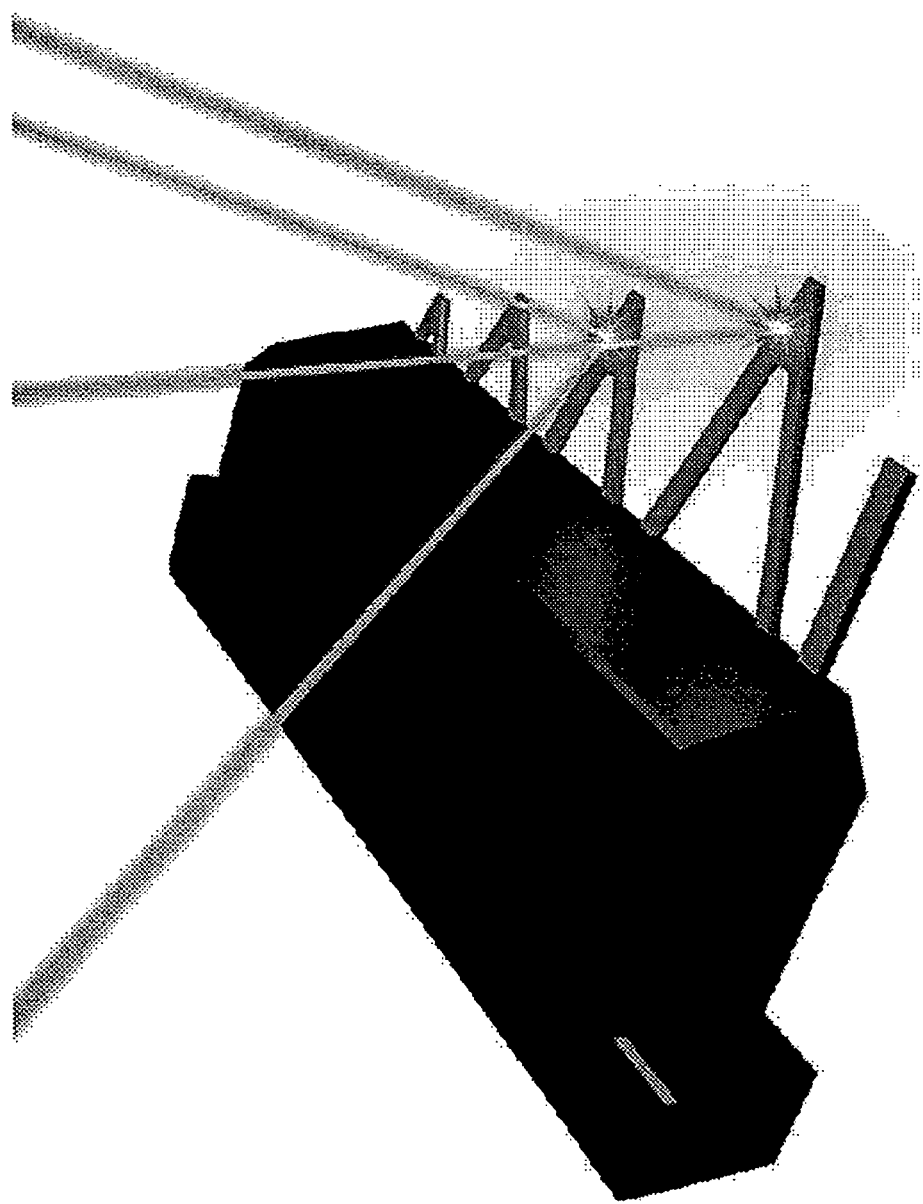
FIG. 3 shows a prior art use of two independent beams to detect an array of two or more SPM cantilevers.
Figure 4:
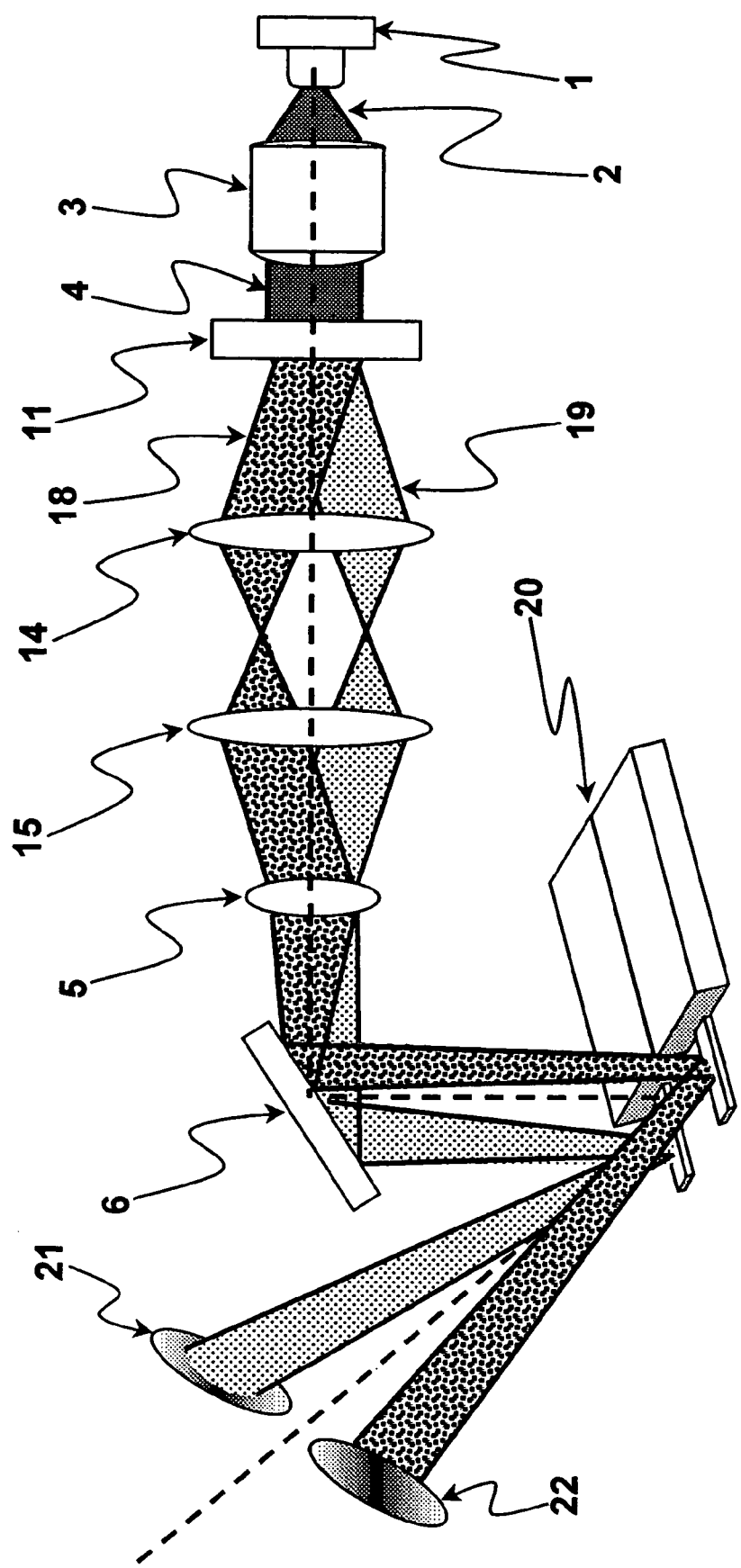
FIG. 4 shows an optical detector using a DOE to form two beams to detect an array of SPM cantilevers or micromechanical sensors.
Figure 5:
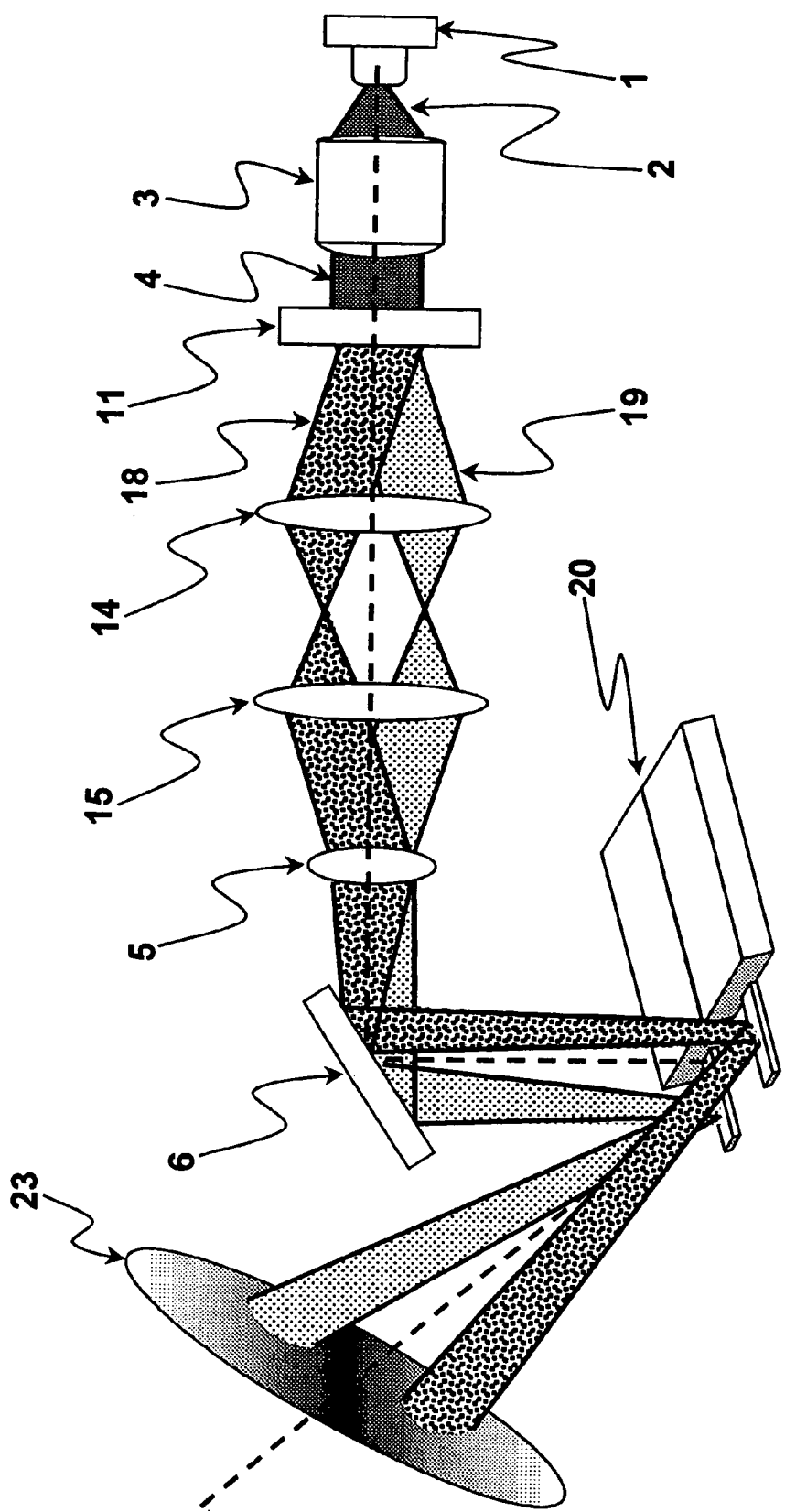
FIG. 5 shows an optical detector using a DOE to form two beams to detect an array of SPM cantilevers or micromechanical sensors that allow the signal from the beams to be identified and measured by a single detector.

As previously indicated, multiple beam optical detector systems, relying on two or more separate light sources focused onto different locations, have previously been disclosed in the prior art. FIG. 3 illustrates one such system (Altmann et al.) employed in an AFM. FIG. 4 shows a multiple beam optical detector for an AFM using a DOE with one light source and split beams focused onto cantilever locations according to the invention disclosed herein. In this embodiment, DOE 11 is an adjustable DOE that splits the incoming beam 4 into two or more beams. The DOE 11 is adjusted to position the two light beams 18 and 19 on two cantilevers shown as part of an array 20. In this embodiment, the reflected beams are detected by spatially separated PSDs 21 and 22. FIG. 5 shows a similar embodiment where the position signals from the two or more reflected beams are detected by a single PSD 23.

Figure 6:
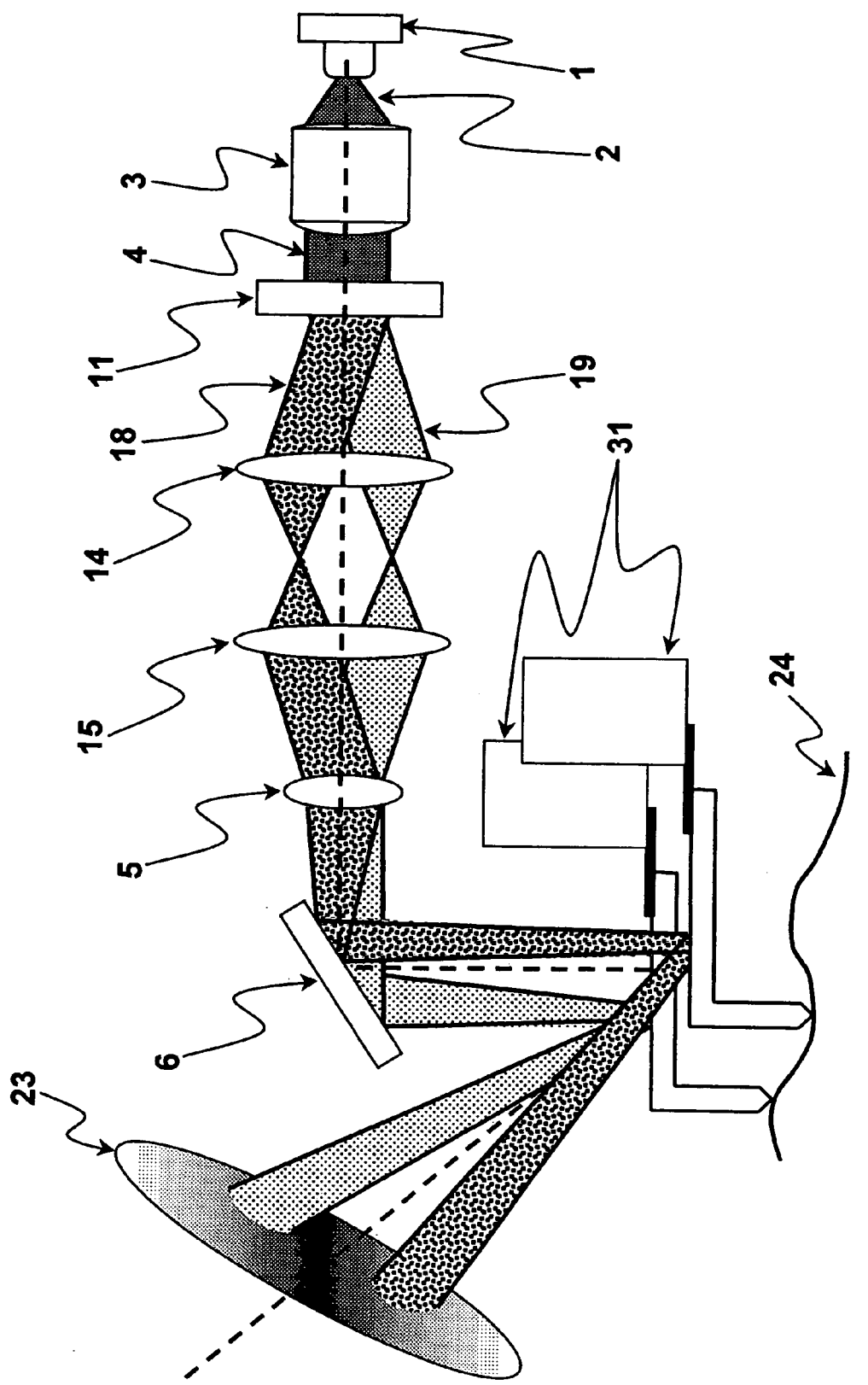
FIG. 6 shows an optical detector using a DOE to form two beams to detect an array of profilometer styli.

A technology closely related to AFM is surface profilometry. U.S. Pat. No. 4,669,300 discloses an illustrative profilometer. Profilers have a sharp stylus that is scanned over a surface. By plotting stylus deflection as a function of position, they develop a surface profile of the sample. The profilometer can be raster scanned in a manner exactly analogous to an AFM cantilever to form a two dimensional image of a surface. As with AFMs, these instruments have significant speed limitations. FIG. 6 shows an embodiment with enhanced speed where a DOE is used to project optical spots onto two or more profilometer styli. As with the AFM examples above, the DOE can be used to vary both the beam shape and position, allowing the sensitivity of the detection scheme to vary and to track the position of moving styli.

Figure 7:
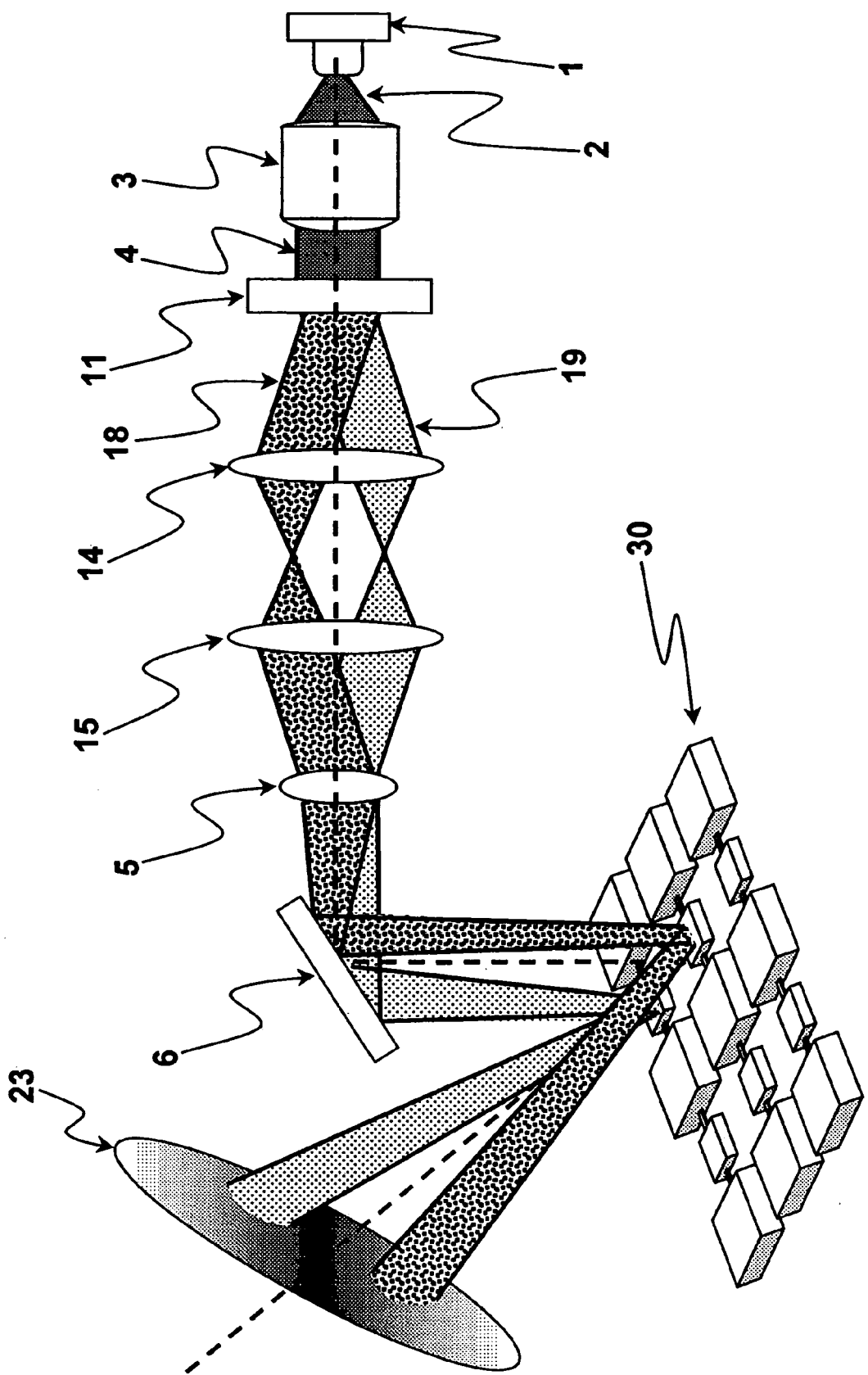
FIG. 7 shows an optical detector using a DOE to form two beams to detect an array of torsional micromechanical sensors.

Cantilevers and profilometer styli are simply two examples of a variety of mechanical sensors that can be measured with the optical beam detection method discussed here. FIG. 7 shows an embodiment similar to that of FIG. 5 where two or more beams are used to measure the angular motion of an array of torsional oscillators 30.

Figure 8:
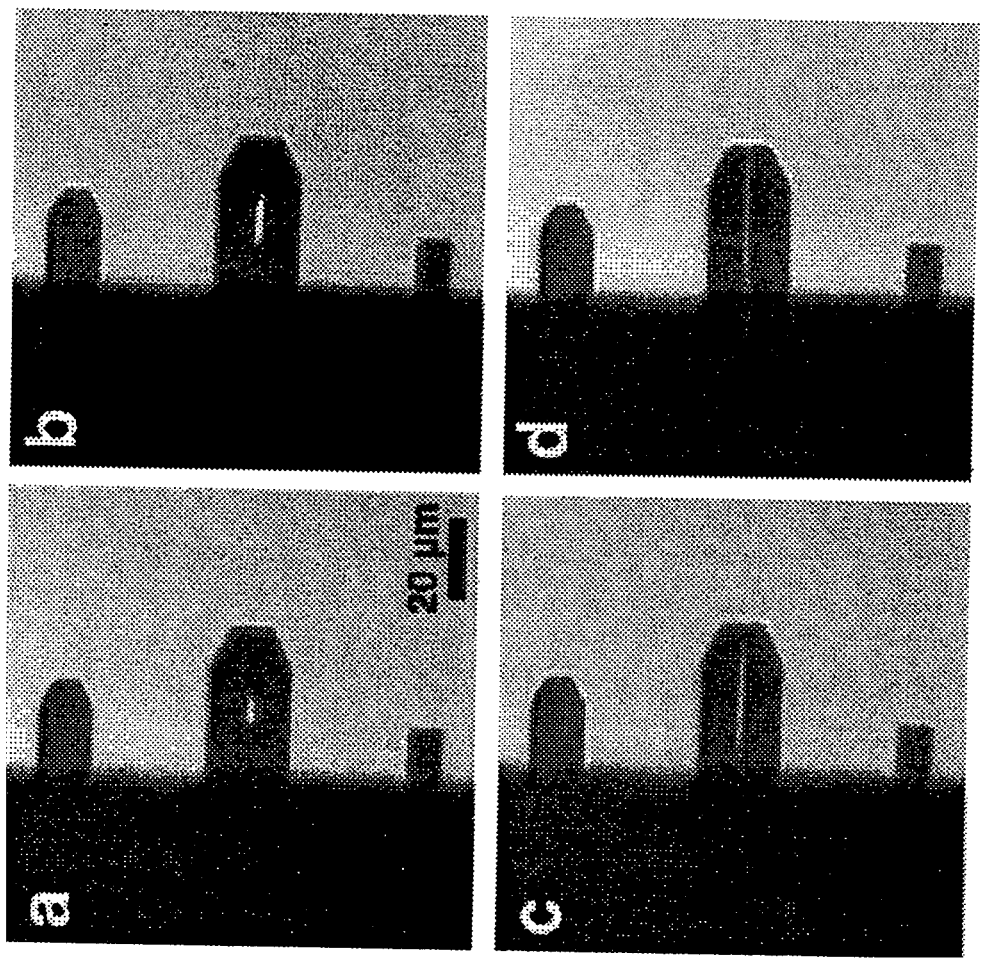
FIG. 8 shows a prior art variation of the laser beam spot size in a SPM optical detector to change sensitivity.

The position of the optical beam is not the only parameter that can be controlled with an optical detector using DOEs. FIG. 8, taken from Schaffer et al., shows four successively longer spots, incident on a cantilever visible in the center of the four photographs, resulting from changes in a single slit. This change in beam shape resulted in a change in the optical lever sensitivity. Adjustable DOEs provide much greater flexibility than the methods employed by Schaffer et al., "Characterization and Optimization of the Detection Sensitivity of an Atomic Force Microscope for Smaller Cantilevers," *J. of Applied Physics*, Nov. 1, 1998, Vol. 84, No. 9, pp. 4661–4666 (hereinafter referred to as "Schaffer et al.") allowing a beam or multiple beams to be shaped dynamically. One disadvantage of the scheme used by Schaffer et al. is that closing the slit to increase the beam length focused on the lever reduces the overall intensity of the beam. Typically, the sensitivity of an optical beam measurement is proportional to the beam intensity. Schaffer et al. were forced to normalize the spot size sensitivity measurements to the reduced intensity. On the other hand, phase shifting DOEs have the advantage of not attenuating the intensity of the transmitted radiation, improving the performance of DOE based beam shaping relative to the scheme used by Schaffer et al. This technique has the advantage of the larger, cantilever beam filling spot size demonstrated by Schaffer et al. without sacrificing light intensity.

Figure 9:
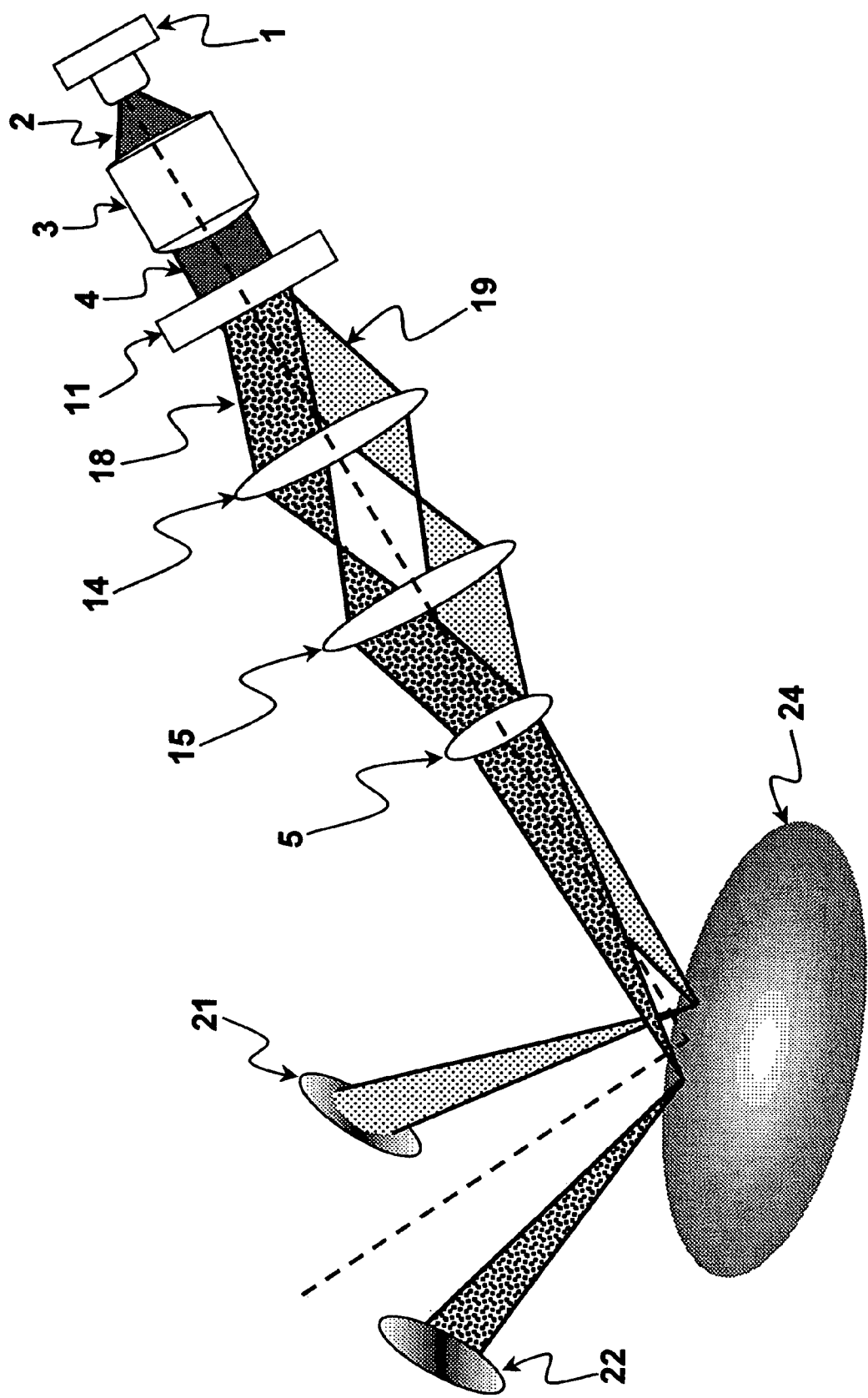
FIG. 9 shows a specular reflection optical profilometer using a DOE for measuring several surface profiles or positions simultaneously
Figure 10:
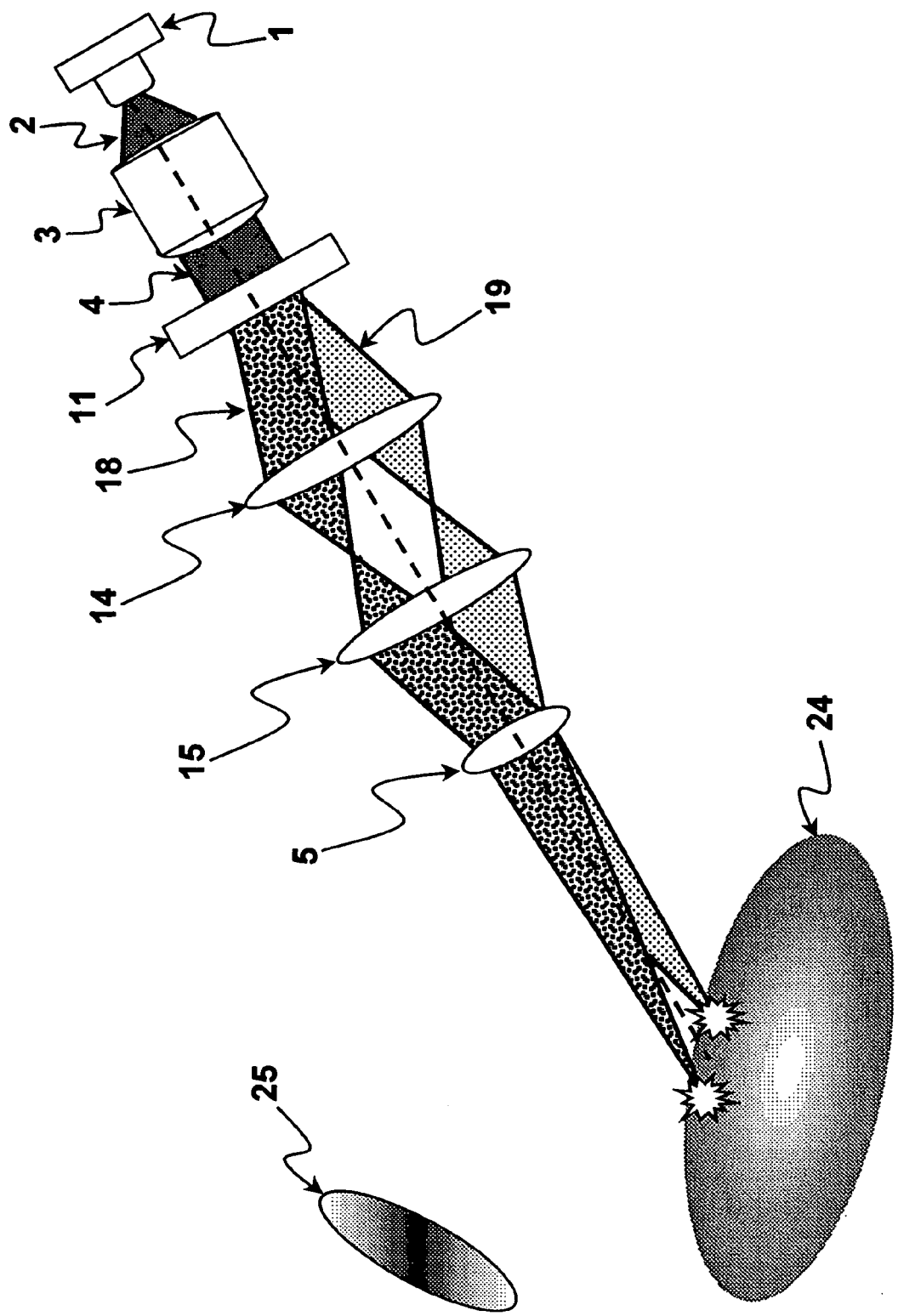
FIG. 10 shows a diffuse reflection optical profilometer using a DOE for measuring several surface profiles or positions simultaneously.

Optical profilometers have been used for some time to provide information about the shape of surfaces. Although these profilometers do not have the spatial resolution of an AFM, they do have the advantage of providing a relatively rapid, non-contact measurement. FIG. 9 shows an application of DOEs to optical profilometry where two or more beams can replace the single beam of a conventional optical profilometer characterizing a sample 24. The optical profilometer shown in FIG. 9 relies on specular reflection from the surface of the sample 24, while the optical profilometer shown in FIG. 10 relies on diffuse reflection from the surface of the sample 24. In the embodiment shown in FIG. 10, the signal from the two or more beams is measured by a single detector 25. That single detector scheme could be used in the case of the optical profilometer shown in FIG. 9 as well.

Figure 11:
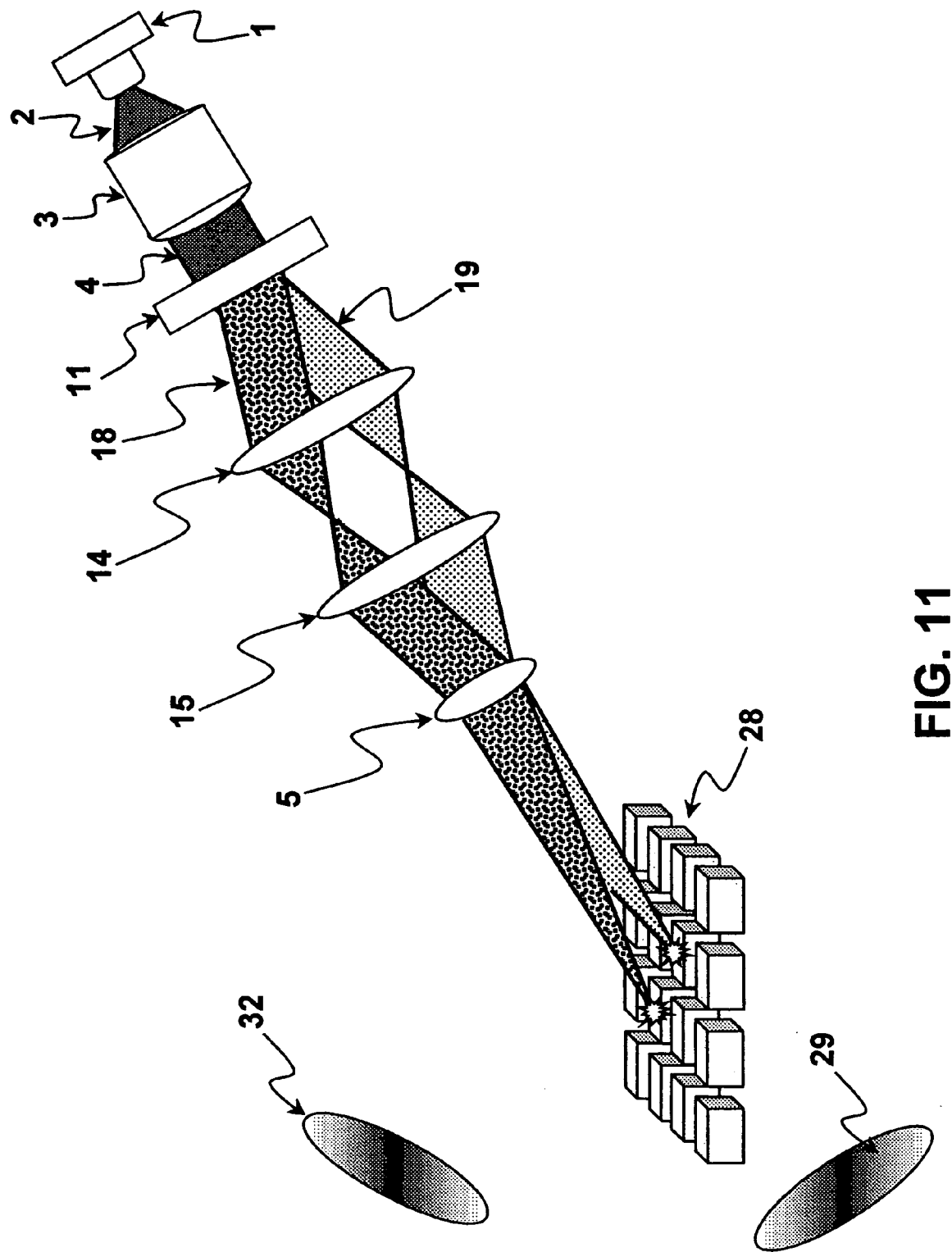
FIG. 11 shows a DOE used to position two or more beams of light on an array of non-mechanical sensors.

There are a number of applications where arrays of sensors that change their optical properties, including reflectance, polarization, transmissibility or fluorescence, in response to specific molecules or other environmental factors may be employed. In this case, there is no mechanical change in the sensor in response to the specific molecules or other environmental factors, but rather a change that is optically detectable. FIG. 11 shows an optical detector using DOEs contructed around such an array. As with the prior embodiments, the ability to position two or more beams has obvious advantages in terms of throughput and simplicity in the design of the detector apparatus. As mentioned above, these sorts of arrays lend themselves to measuring transmitted light using a detector 29 beneath the array surface as well as reflected light using a detector above the surface 25.

The described embodiments of the invention are only considered to be preferred and illustrative of the inventive concept. The scope of the invention is not to be restricted to such embodiments. Various and numerous other arrangements may be devised by one skilled in the art without departing from the spirit and scope of the invention.

What is claimed is:

1. In an atomic force microscope having a moveable cantilever, an optical position detector comprising:
   a light source;
   an adjustable diffractive optical element positioned to receive a light beam emitted by the light source and transmit a first light beam in a first direction when the adjustable diffractive optical element is in a first configuration and in other directions when the adjustable diffractive optical element is in other configurations;
   a focusing assembly to focus the first light beam emerging in the first direction or the other directions onto the moveable cantilever, wherein the first light beam emerging in the first direction is focused on the cantilever when the cantilever is in a first position, and the first light beam emerging in other directions is focused on the cantilever when the cantilever is in other positions; and
   a position sensitive detector to collect a light beam reflected from the cantilever in the first and other positions, with the output of the position sensitive detector varying as a deflection of the cantilever changes.

2. The optical position detector of claim 1, wherein the first light beam in the first direction and the first light beam in the other directions are distinct beams with distinct shapes or intensities.

3. The optical position detector of claim 1, wherein the adjustable diffractive optical element of the optical position detector is adapted to cause the first light beam to track the movement of the cantilever.

4. The optical position detector of claim 1, wherein the adjustable diffractive optical element is adapted to modulate the first light beam so as to cause a movement of the cantilever.

5. The optical position detector of claim 1, wherein the adjustable diffractive optical element is selected from the group consisting of a manually adjustable diffractive optical element and a computer controllable diffractive optical element.

6. The optical position detector of claim 1, wherein the adjustable diffractive optical element is configured to perform phase encoding, amplitude encoding or a combination of phase encoding and amplitude encoding.

7. In an atomic force microscope having a plurality of cantilevers, an optical position detector comprising:
   a light source;
   an adjustable diffractive optical element positioned to receive a light beam emitted by the light source and transmit the light beam in selectable and adjustable directions;
   a focusing assembly to focus the light beam emerging from the adjustable diffractive optical element onto the plurality of cantilevers; and
   one or more position sensitive detectors to collect a plurality of reflected light beams, reflected from the plurality of cantilevers, and to produce an output that varies as a deflection of the plurality of cantilevers changes.

8. The optical position detector of claim 7, wherein the adjustable diffractive optical element of the optical position detector is adapted to cause the light beam to track movement of the plurality of cantilevers.

9. The optical position detector of claim 7, wherein the adjustable diffractive optical element is adapted to modulate the light beams so as to cause movement of the plurality of cantilevers.

10. The optical position detector of claim 7, wherein the adjustable diffractive optical element is selected from the group consisting of a manually adjustable diffractive optical element and a computer controllable diffractive optical element.

11. The optical position detector of claim 7, wherein the adjustable diffractive optical element is configured to perform phase encoding, amplitude encoding or a combination of phase encoding and amplitude encoding.

* * * * *